US011660962B2

(12) United States Patent
Choi et al.

(10) Patent No.: US 11,660,962 B2
(45) Date of Patent: May 30, 2023

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Sunho Choi, Hwaseong-si (KR); Seungwon Park, Hwaseong-si (KR); Sungtae Kim, Seoul (KR); Yong Hyun Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 301 days.

(21) Appl. No.: 17/115,509

(22) Filed: Dec. 8, 2020

(65) Prior Publication Data
US 2022/0024311 A1  Jan. 27, 2022

(30) Foreign Application Priority Data
Jul. 22, 2020 (KR) .................. 10-2020-0090816

(51) Int. Cl.
*B60K 35/00* (2006.01)
*B60L 58/14* (2019.01)
(52) U.S. Cl.
CPC .............. *B60K 35/00* (2013.01); *B60L 58/14* (2019.02); *B60K 2370/167* (2019.05)
(58) Field of Classification Search
CPC .............. B60K 35/00; B60K 2370/167; B60K 2370/169; B60L 58/14; B60L 50/61; B60L 58/12; B60L 2240/547; B60L 2240/549; B60L 2250/10; B60L 2250/16; Y02T 10/62; Y02T 10/70
See application file for complete search history.

(56) References Cited

U.S. PATENT DOCUMENTS

| | | | |
|---|---|---|---|
| 2005/0017686 A1* | 1/2005 | Sakakibara | H01M 10/44 320/132 |
| 2015/0042274 A1* | 2/2015 | Kim | H02J 7/06 320/108 |
| 2016/0124053 A1* | 5/2016 | Akaishi | G01R 31/392 701/33.4 |
| 2018/0050601 A1* | 2/2018 | Katanoda | B60L 58/13 |
| 2022/0060038 A1* | 2/2022 | Zhang | H02J 7/00036 |

* cited by examiner

*Primary Examiner* — Omeed Alizada
(74) *Attorney, Agent, or Firm* — Lempia Summerfield Katz LLC

(57) ABSTRACT

A vehicle includes: a battery; a sensor configured to detect at least one of a charging state, a discharging state, or a performance state of the battery; a display configured to display the state of the battery; and a controller configured to judge a cause of discharge of the battery based on the detection result of the sensor, to determine at least one of the charging voltage, charging current, or charging time of the battery based on the determination result, and to control the display to display a charging mode of the battery based on the determined charging voltage, charging current, or charging time.

18 Claims, 6 Drawing Sheets

VEHICLE AND CONTROL METHOD THEREOF

CROSS-REFERENCE TO RELATED APPLICATION(S)

This application is based on and claims priority under 35 U.S.C. § 119 to Korean Patent Application No. 10-2020-0090816, filed on Jul. 22, 2020, the disclosure of which is incorporated herein by reference in its entirety.

BACKGROUND

1. Technical Field

The present disclosure relates to a vehicle and a control method thereof. Specifically, the present disclosure relates to detecting a battery state of a vehicle and determining an appropriate charging mode.

2. Description of the Related Art

A vehicle battery charging method according to the prior art is a method of simply determining whether the battery is discharged or not and charging for a fixed time at a fixed voltage at a time when a discharge flag occurs due to a dark current.

However, in the prior art, since the battery discharge history cannot be determined, it is not possible to know for what reason the battery has been discharged. Thus, there is a problem in that it is not possible to determine an appropriate battery charging mode.

SUMMARY

Therefore, it is an aspect of the present disclosure to provide a vehicle that determines a cause of discharge of a battery and proposes an appropriate charging mode according to the cause of discharge. It is another aspect of the present disclosure to provide a control method thereof.

In addition, it is another aspect of the present disclosure to provide a vehicle that determines a discharge history of a battery and determines a cause of discharge of a battery. It is yet another aspect of the present disclosure to provide a control method thereof.

In accordance with one aspect of the disclosure, a vehicle includes: a battery; a sensor configured to detect at least one of a charging state, a discharging state, or a performance state of the battery; a display configured to display the state of the battery; and a controller configured to judge a cause of discharge of the battery based on the detection result of the sensor, to determine at least one of the charging voltage, charging current, or charging time of the battery based on the determination result, and to control the display to display a charging mode of the battery based on the determined charging voltage, charging current, or charging time.

The controller may be configured to calculate an internal resistance, a total amount of discharge, an order of discharge, a discharge time, or an average discharge current of the battery, and to control the display to display the charging mode of the battery based on the calculation result.

The controller may be configured to judge the discharge history of the battery. When it is judged that there is a discharge history of the battery, the controller may be configured to judge a discharge time and an amount of discharge of the battery based on the discharge history.

The controller may be configured to judge whether the discharge time of the battery is within a time that is equal to or shorter than a preset time. When it is judged that the battery is discharged within a time that is equal to or shorter than the preset time, the controller may be configured to determine a charging mode by setting the charging voltage as a first charging voltage, the charging current as a first charging current, and the charging time as a first charging time, and to control the display to display the determined charging mode.

The controller may be configured to judge whether the discharge time of the battery is within a time that is longer than a preset time. When it is judged that the battery is discharged within a time that is longer than the preset time, the controller may be configured to determine a charging mode by setting the charging voltage as a second charging voltage, the charging current as a second charging current, and the charging time as a second charging time, and to control the display to display the determined charging mode.

The vehicle may further include a storage configured to store the charging mode information. The controller may be configured to allow the charging mode to be stored in the storage.

The vehicle may further include a power supply configured to supply power to the battery. The controller is configured to control the display to display a forced discharge warning signal of the power supply based on the determination result.

The controller may be configured to control the display so that the vehicle displays a discharge warning or a discharge warning signal for an external electronic device provided in the vehicle based on the determination result.

The controller may be configured to compare the performance state value of the battery with the performance state value in the full charge state of the battery. When it is judged that the performance state value of the battery has a value lower than a reference ratio of the full charge state value of the battery, the controller may be configured to determine a charging mode by setting the charging voltage as a third charging voltage, the charging current as a third charging current, and the charging time as a third charging time, and to control the display to display the determined charging mode.

The controller may be configured to compare the current value of the internal resistance and the initial value of the internal resistance. When it is judged that the current value of the internal resistance is greater than the initial value of the internal resistance, the controller may be configured to determine a charging mode by setting the charging voltage as a fourth charging voltage, the charging current as a fourth charging current, and the charging time as a fourth charging time, and to control the display to display the determined charging mode.

In accordance with one aspect of the disclosure, a control method of a vehicle includes: detecting at least one of a charging state, a discharging state, or a performance state of the battery; displaying the state of the battery; judging a cause of discharge of the battery based on the detection result; determining at least one of the charging voltage, charging current, or charging time of the battery based on the determination result; and controlling the display to display a charging mode of the battery based on the determined charging voltage, charging current, or charging time.

The controlling may include: calculating an internal resistance, a total amount of discharge, an order of discharge, a discharge time, or an average discharge current of the battery; and controlling the display to display the charging mode of the battery based on the calculation result.

The controlling may include judging the discharge history of the battery. When it is judged that there is a discharge history of the battery, the controlling may include judging a discharge time and an amount of discharge of the battery based on the discharge history.

The controlling may include: judging whether the discharge time of the battery is within a time that is equal to or shorter than a preset time; when it is judged that the battery is discharged within a time that is equal to or shorter than the preset time, determining a charging mode by setting the charging voltage as a first charging voltage, the charging current as a first charging current, and the charging time as a first charging time; and displaying the determined charging mode.

The controlling may include: judging whether the discharge time of the battery is within a time that is longer than a preset time; when it is judged that the battery is discharged within a time that is longer than the preset time, determining a charging mode by setting the charging voltage as a second charging voltage, the charging current as a second charging current, and the charging time as a second charging time; and displaying the determined charging mode.

The control method may further include: storing the charging mode information and the controlling may include storing the charging mode in the storage.

The control method may further include supplying power to the battery and the controlling may include controlling the display to display a forced discharge warning signal of the power supply based on the determination result.

The controlling may include controlling the display so that the vehicle displays a discharge warning or a discharge warning signal for an external electronic device provided in the vehicle based on the determination result.

The controlling may include: comparing the performance state of the battery with the performance state in the full charge state of the battery; when it is judged that the performance state of the battery is a reference ratio of the full charge state of the battery, determining a charging mode by setting the charging voltage as a third charging voltage, the charging current as a third charging current, and the charging time as a third charging time; and displaying the determined charging mode.

The controlling may include: comparing the current value of the internal resistance and the initial value of the internal resistance; when it is judged that the current value of the internal resistance is greater than the initial value of the internal resistance, determining a charging mode by setting the charging voltage as a fourth charging voltage, the charging current as a fourth charging current, and the charging time as a fourth charging time; and displaying the determined charging mode.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
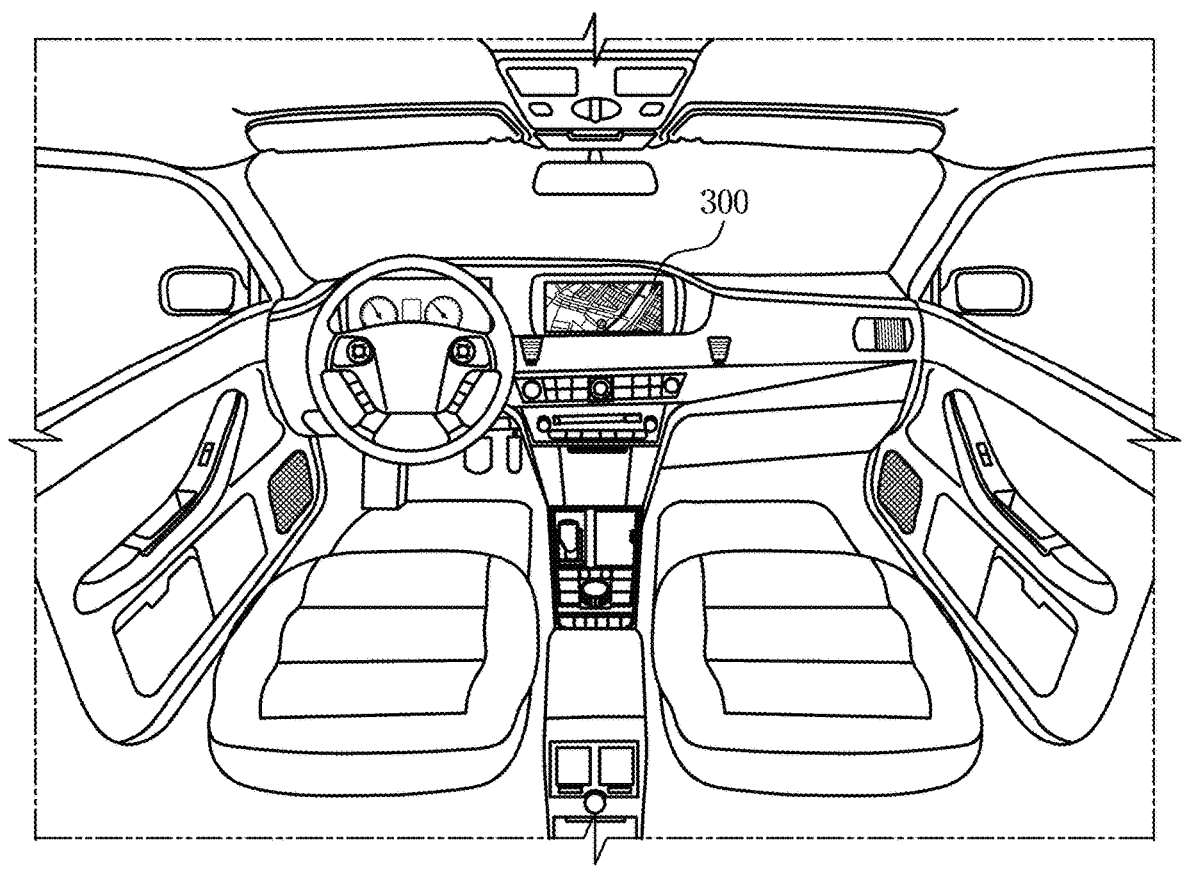
FIG. 1 is a view illustrating the inside of a vehicle according to an embodiment of disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may have been omitted for increased clarity and conciseness.

Additionally, specific embodiments are now described more fully hereinafter with reference to the accompanying drawings. The embodiments may, however, be embodied in many different forms and should not be construed as being limited to the embodiments set forth herein. These specific embodiments are provided so that this disclosure will be thorough and complete and will fully convey the embodiments and concepts to those of ordinary skill in the art. Like numerals denote like elements throughout.

It should be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It should be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference is now made in detail to the embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, the operating principle and embodiments of the present disclosure are described with reference to the accompanying drawings.

The vehicle disclosed in the disclosure may be a hybrid vehicle, but is not limited thereto.

Figure 2:
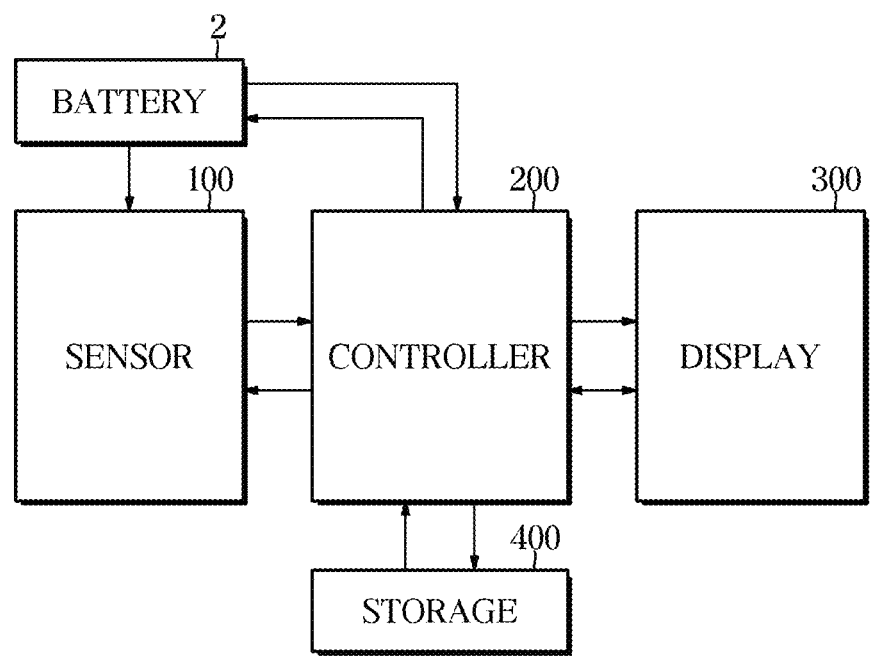
FIG. 2 is a control block diagram of a vehicle according to an embodiment of disclosure.

FIGS. 1 and 2 illustrate the configuration of a vehicle 1 according to an embodiment of the disclosure.

Referring to FIGS. 1 and 2, the vehicle 1 according to the disclosed embodiment may include a battery 2, a sensor 100, a controller 200, a display 300, and/or a storage 400.

In addition, the vehicle 1 according to the disclosed embodiment may include a power supply (not shown) that transmits power from the battery 2 to a plurality of devices provided in the vehicle 1.

According to the disclosed embodiment, the battery 2 is a device for supplying power to a plurality of devices provided in the vehicle 1. The battery 2 may include a high voltage battery or a low voltage battery.

The high voltage battery may be a battery applied to driving a vehicle. The low voltage battery may be a battery applicable to vehicle accessories such as radio, air conditioner, navigation, etc., but is not limited thereto.

The sensor 100 according to the disclosed embodiment may detect a charging state or state of charge (SOC), a performance state or state of health (SOH), or a discharging state of the battery 2.

Specifically, the sensor 100 may include a battery sensor, and may detect internal resistance, total amount of discharge, order of discharge, discharge time, or average discharge current of the battery 2. Also, the sensor 100 may detect the discharge history of the battery 2.

However, the sensor included in the sensor 100 is not limited to the battery sensor and may include other components capable of detecting the charging state, the performance state, or the discharging state of the battery 2.

The controller 200 according to the disclosed embodiment judges the cause of discharge of the battery 2 based on the detection result of the sensor 100. The controller 200 determines at least one of the charging voltage, charging current, or charging time of the battery 2 based on the determination result and controls the display 300 to display the charging mode of the battery 2 based on the determined charging voltage, charging current, or charging time.

Specifically, the controller 200 may calculate the internal resistance, the total amount of discharge, the order of discharge, the discharge time, or the average discharge current of the battery 2. The controller 200 may determine the charging mode of the battery 2 based on the calculation result.

In addition, the controller 200 may judge the discharge history of the battery 2 and may judge the discharge time and the amount of discharge of the battery 2 based on the discharge history. In addition, the controller 200 may determine a charging time, a charging voltage, or a charging current based on the judged discharge time and amount of discharge of the battery 2.

The process of determining the charging time, the charging voltage, or the charging current by the controller 200 according to the disclosed embodiment is described in detail with reference to FIGS. 3 and 4.

The controller 200 may be implemented as a memory (not shown) that stores an algorithm for controlling the operation of components in the vehicle 1 or data about a program that reproduces the algorithm, and as a processor (not shown) that performs the above-described operation using data stored in the memory. In this case, the memory and the processor may be implemented as separate chips, respectively. Alternatively, the memory and the processor may be implemented as a single chip.

The display 300 according to the disclosed embodiment may display the state of the battery 2 and warn the user of charging or replacing the battery 2.

Specifically, the display 300 may display the charging voltage, charging current, or charging time of the battery 2.

The display 300 may be provided as a cathode ray tube (CRT), a digital light processing (DLP) panel, a plasma display panel, a liquid crystal display (LCD) panel, an electroluminescent (EL) panel, an Electrophoretic Display (EPD) panel, an Electrochromic Display (ECD) panel, a Light Emitting Diode (LED) panel, or an Organic Light Emitting Diode (OLED), but is not limited thereto.

The storage 400 according to the disclosed embodiment may store battery 2 charging mode information judged by the controller 200 and may share the stored information with the vehicle 1 service center.

Specifically, the storage 400 may store internal resistance, total amount of discharge, order of discharge, discharge time, or average discharge current information of the battery 2. The storage 400 may also store discharge history of the battery 2.

In addition, the storage 400 may store real-time performance state, charge state, and discharge state information of the battery 2.

The storage 400 is a nonvolatile memory device such as cache, read only memory (ROM), programmable ROM (PROM), erasable programmable ROM (EPROM), electrically erasable programmable ROM (EPMROM). Flash memory or random access memory (RAM) may be implemented as a volatile memory device, but is not limited thereto. The storage may be a memory implemented in a separate chip from the processor described above with respect to the controller, or may be implemented in a single chip with the processor.

Meanwhile, the vehicle 1 according to the disclosed embodiment may include a communication device (not shown) capable of communicating between components provided in the vehicle 1.

The communication device (not shown) may include one or more components enabling communication with an external device, and may include, for example, at least one of a short-range communication module, a wired communication module, and a wireless communication module.

The short-range communication module may include various short-range communication modules that transmit and receive signals using a wireless communication network in a short range Such modules may include a Bluetooth module, an infrared communication module, a radio frequency identification (RFID) communication module, a wireless local access network (WLAN) communication module, an NFC communication module, a Zigbee communication module, or the like.

Wired communication modules include various wired communication modules such as Controller Area Network (CAN) communication modules, Local Area Network (LAN) modules, Wide Area Network (WAN) modules, or Value Added Network (VAN) modules. In addition, the wired communication module includes various cable communication modules such as USB (Universal Serial Bus), HDMI (High Definition Multimedia Interface), DVI (Digital Visual Interface), RS-232 (recommended standard232), power line communication, or plain old telephone service (POTS).

In addition to the Wi-Fi module and the WiBro module, the wireless communication module may include a wireless communication module supporting various wireless communication methods such as Global System for Mobile Communication (GSM), Code Division Multiple Access (CDMA), Wideband Code Division Multiple Access (WCDMA), and Universal Mobile Telecommunications System (UMTS), Time Division Multiple Access (TDMA), Long Term Evaluation (LTE), or the like.

The wireless communication module may include a wireless communication interface including an antenna and a transmitter for transmitting signals. In addition, the wireless communication module may further include a signal conversion module for modulating a digital control signal output from the controller 200 through a wireless communication interface under control of the controller into an analog type wireless signal.

The wireless communication module may include a wireless communication interface including an antenna and a receiver for receiving signals. In addition, the wireless communication module may further include a signal conversion module for demodulating an analog wireless signal received through the wireless communication interface into a digital control signal.

At least one component may be added or deleted corresponding to the performance of the components of the vehicle 1 shown in FIGS. 1 and 2. In addition, it should be readily understood by those of ordinary skill in the art that the mutual positions of the components may be changed corresponding to the performance or structure of the system.

Meanwhile, each of the components shown in FIGS. 1 and 2 refers to software and/or Field Programmable Gate Array (FPGA) and a hardware component such as Application Specific Integrated Circuit (ASIC).

The following describes a process in which the controller 200 judges the battery 2 charging mode.

Figure 3:
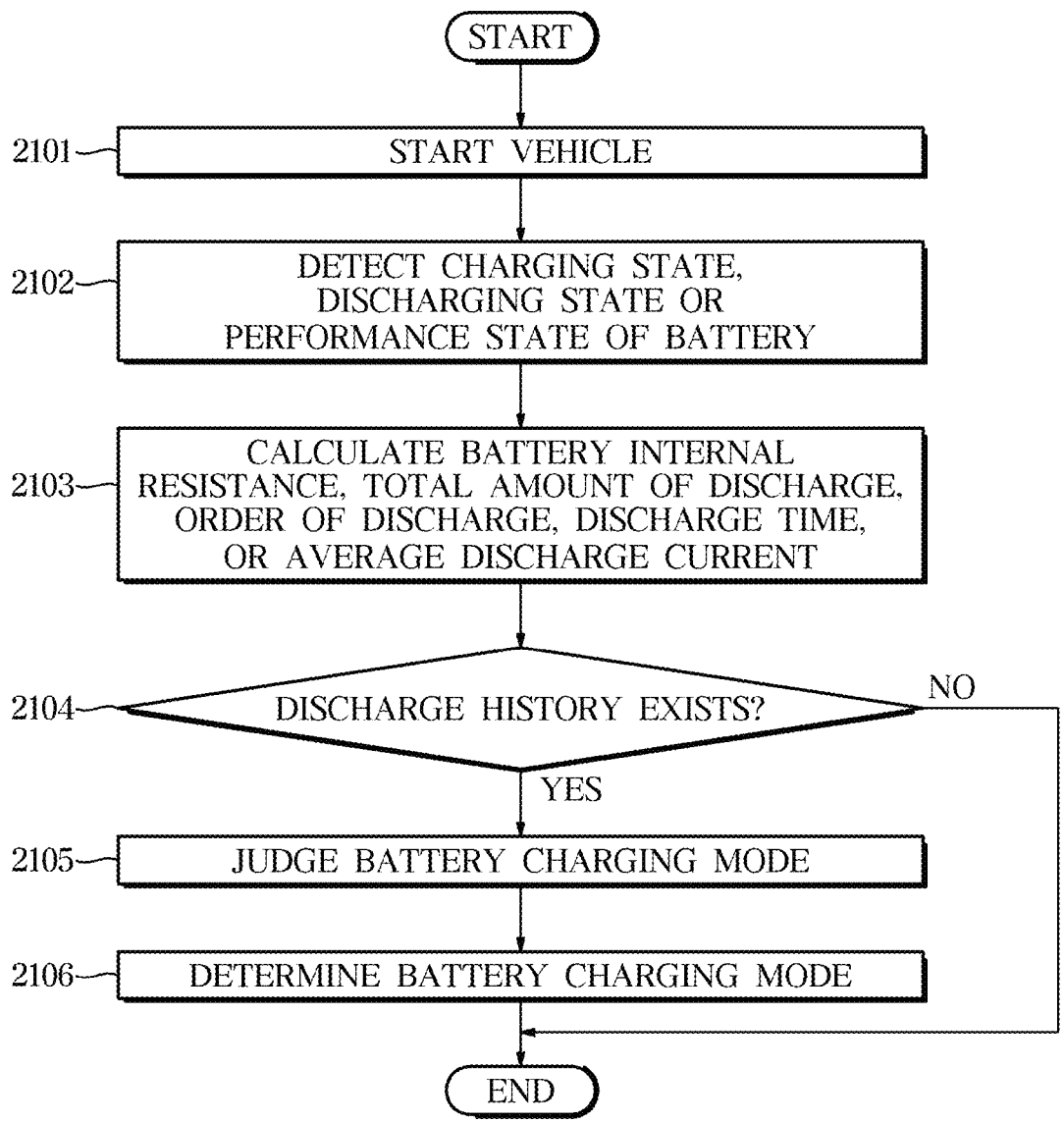
FIG. 3 is a diagram illustrating a process of determining a battery charging mode by the controller according to an embodiment of disclosure.

FIG. 3 is a diagram illustrating a process of judging a battery charging mode by the controller according to an embodiment of the disclosure.

The controller 200 according to the disclosed embodiment judges whether the vehicle 1 is started (2101).

When it is judged that the vehicle 1 has been started, the sensor 100 detects the charging state, the discharging state, or the performance state of the battery 2. The controller 200 receives the detection result from the sensor 100 (2102).

Specifically, the charging state, the discharge state, or the performance state of the battery 2 may include the internal resistance, the total amount of discharge, the order of discharge, the discharge time, or the average discharge current of the battery 2. However, the charging state, discharge state, or performance state information of the battery 2 is not limited thereto.

The controller 200 may calculate the internal resistance, the total amount of discharge, the order of discharge, the discharge time, or the average discharge current of the battery 2 based on the received charge state, discharge state, or performance state information of the battery 2 (2103).

When the charge state, discharge state, or performance state information of the battery 2 is judged, the controller 200 judges whether discharge history exists in the battery 2 (2104).

If it is judged that there is a discharge history of the battery 2, the controller 200 judges and determines the battery charging mode (2105, 2106). However, if it is judged that there is no discharge history of the battery 2, the controller 200 ends the judgment process.

A detailed process of judging the charging mode of the battery 2 is described below while describing FIG. 4.

Figure 4:
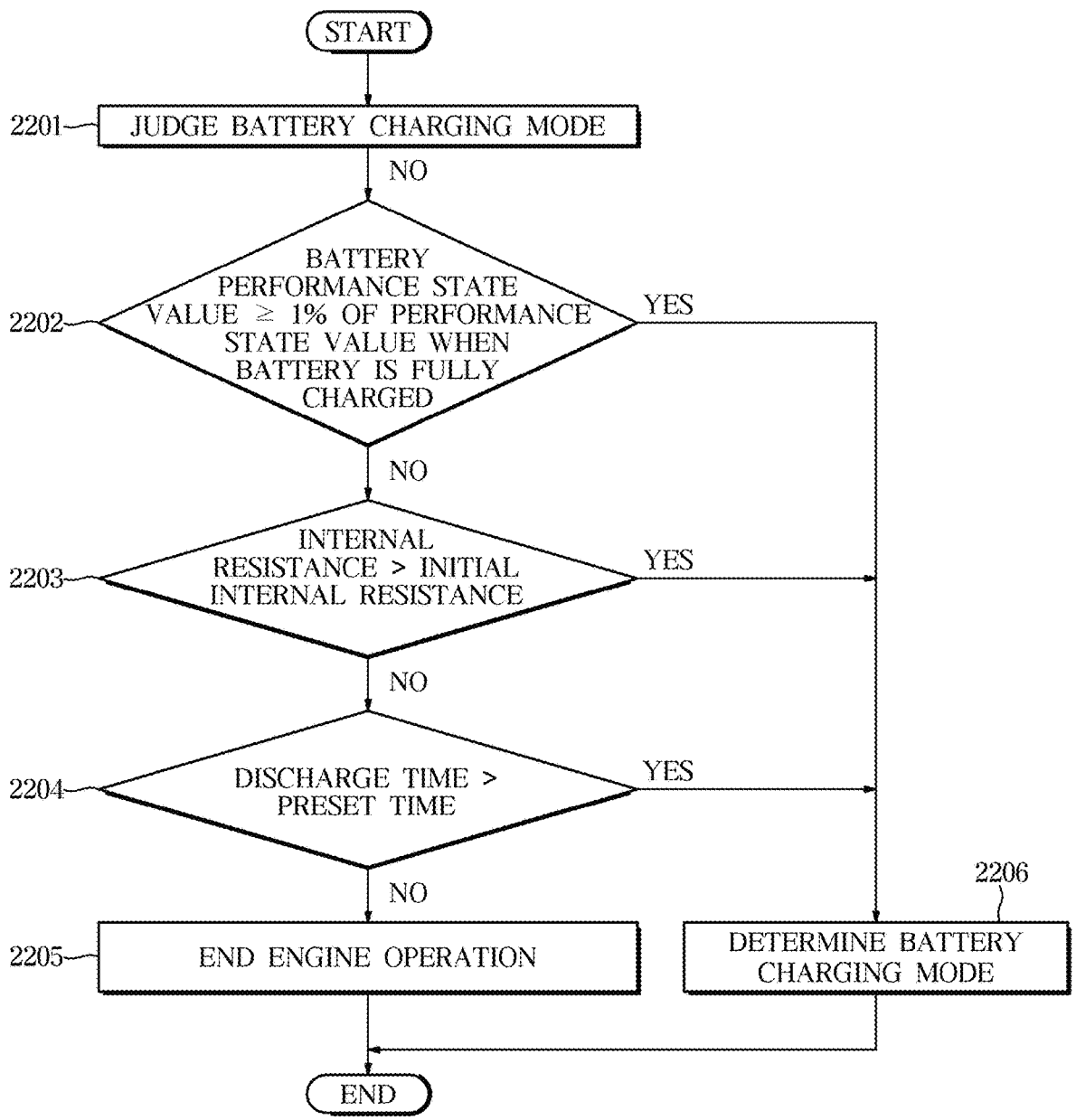
FIG. 4 is a diagram illustrating a process of determining detailed information of a battery charging mode by a controller according to an embodiment of disclosure.

FIG. 4 is a diagram illustrating a process of determining detailed information of a battery charging mode by a controller according to an embodiment of the disclosure.

The controller 200 according to the disclosed embodiment may judge the battery 2 charging mode (2201).

The controller 200 quantifies the performance state of the battery 2 and may compare the current performance state value with the performance state value when the battery 2 is fully charged (2202).

According to one disclosed embodiment, when it is judged that the current performance state value of the battery 2 is less than 1% of the performance state value when the battery 2 is fully charged, the controller 200 compares the current internal resistance of the battery 2 and the initial internal resistance of the battery 2 (2203).

However, when the current performance state value of the battery 2 is judged to be more than or equal to 1% of the performance state value when the battery 2 is fully charged, the controller 200 determines the battery 2 charging mode (2206).

In this case, the controller 200 may determine the charging mode by setting the charging voltage as the third charging voltage, the charging current as the third charging current, and the charging time as the third charging time.

For example, the controller may determine the charging mode to charge to the third charging voltage to 14.8V, to the third charging current to 50 A, and to a time point at which the charging time becomes 85% of the full charge state. However, the charging mode information is not limited thereto and may vary according to the state and type of the battery 2.

When it is judged that the current internal resistance value of the bat e exceeds the initial internal resistance value of the battery 2, the controller 200 judges that the current battery 2 is old, and determines the battery 2 charging mode. However, when it is judged that the current internal resistance value of the battery 2 is less than or equal to the initial internal resistance value of the battery 2, the controller 200 compares the discharge time of the battery 2 with a preset discharge reference time and determines a battery charging mode (2204, 2206).

Specifically, when it is judged that the internal resistance value of the battery 2 exceeds the initial internal resistance value of the battery 2, the controller 200 may determine the charging mode by setting the charging voltage as the fourth charging voltage, the charging current as the fourth charging current, and the charging time as the fourth charging time.

Here, the fourth meaning refers to a value set when it is determined that the internal resistance value of the battery 2 exceeds the initial internal resistance value of the battery 2. The meaning, however, may vary according to user definition.

Here, the preset time is a time that serves as a criterion or reference value for determining whether the battery 2 is overcurrent discharged or current acceptance overcharged. The preset time may vary depending on the type, capacity, life, state, or age of the battery 2.

When it is judged that the battery 2 is discharged within a time that is equal to or shorter than or less than the preset time as a result of comparing the discharge time of the battery 2 with the preset discharge reference time, the controller 200 may determine the charging mode by setting the charging voltage as the first charging voltage, the charging current as the first charging current, and the charging time as the first charging time.

For example, the controller 200 may determine a charging mode to charge the first charging voltage to 14.8V, the first charging current to 50 A, and until the first charging time becomes 1.1 times the initial value of the internal resistance.

However, the charging mode information is not limited thereto, and may vary according to the state and type of the battery 2 (2206).

In addition, the controller judges whether the discharge time of the battery 2 is within a time that is longer than or more than a preset time. When it is judged that the battery 2 is discharged within a time that is longer than or more than the preset time, the controller 200 may determine a charging mode by setting the charging voltage as a second charging voltage, the charging current as a second charging current, and the charging time as a second charging time.

For example, the controller 200 may determine the charging mode by setting the second charging voltage to between 14.5V to 14.8V, the second charging current to between 30 A to 50 A, and the second charging time to between 1.5 to 2 hours. However, the charging mode information is not limited thereto and may vary according to the state and type of the battery 2.

Specifically, when it is judged that the discharge time of the battery 2 is more than the preset time and less than 2 times, i.e., twice, the preset time, the controller 200 may determine the charging mode by setting the charging voltage to 14.5V, the charging current to 30 A, and the charging time to 1.5 hours. However, the charging mode information is not limited thereto and may vary according to the state and type of the battery 2.

In addition, when it is judged that the discharge time of the battery 2 exceeds twice the preset time, the controller 200 may determine the charging mode by setting the charging voltage to 14.8V, the charging current to 50 A, and the charging time to 1.5 hours. However, the charging mode information is not limited thereto and may vary according to the state and type of the battery 2.

However, when it is determined that the discharge time of the battery 2 is equal to or less than the preset time, the controller 200 ends the engine operation of the vehicle 1 and ends the control process (2205).

Figure 5:
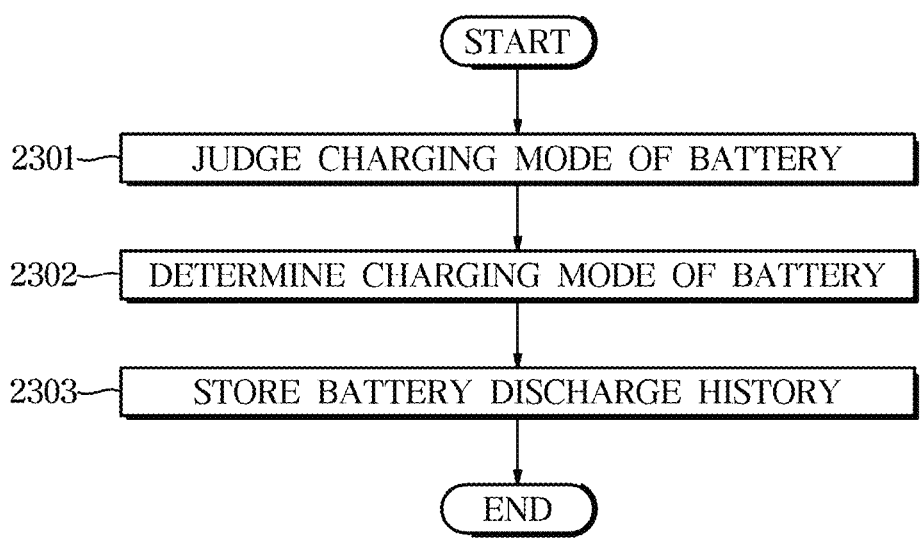
FIG. 5 is a diagram illustrating a process of storing a battery discharge history by a controller according to an embodiment of disclosure.

FIG. 5 is a diagram illustrating a process of storing a battery discharge history by a controller according to an embodiment of the disclosure.

As described above in FIGS. 3 and 4, the controller 200 according to the disclosed embodiment judges and determines the charging mode of the battery 2 (2301, 2302).

When the battery 2 charging mode is determined, the controller 200 may store the battery 2 discharge history used in the judgment process of the determined charging mode in the storage 400 (2303).

As the storage 400 stores the discharge history of the battery 2, the disclosed embodiment makes it possible to check the discharge history and cause of the discharge by service center as well as to improve the product quality by notifying the customer about the discharge of the battery 2.

Figure 6:
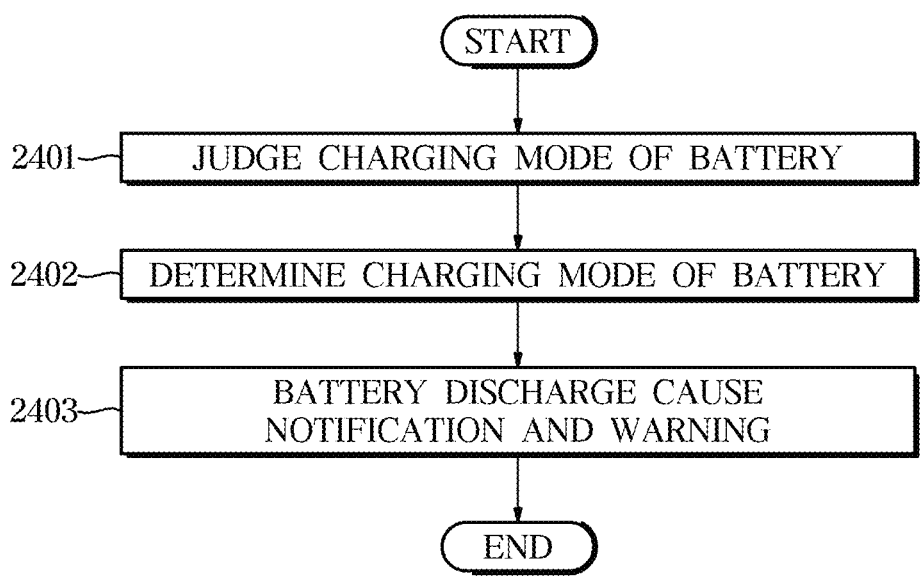
FIG. 6 is a diagram illustrating a process of displaying and warning of battery discharge information to a user by a controller according to an embodiment of disclosure.

FIG. 6 is a diagram illustrating a process of displaying and warning of battery discharge information to a user by a controller according to an embodiment of disclosure.

As described above in FIGS. 3 and 4, the controller 200 according to the disclosed embodiment judges and determines the charging mode of the battery 2 (2401, 2402).

When the battery 2 charging mode is determined, the controller 200 analyzes the determined charging mode and controls the display 300 to notify the user of the cause of discharge of the battery 2. In addition, the controller 200 may control the display 300 to notify the charging, replacement, or forced discharge warning signal of the battery 2 (2403). In addition, the controller 200 may control the display 300 to display a discharge warning of the vehicle 1 or a discharge warning signal of an external electronic device provided in the vehicle 1 based on the battery 2 discharge time determination result.

Here, the notification or warning method may include a method of notifying a user through a display, a head up display (HUD), or human-machine interface (HMI) provided in the vehicle 1. However, the notification or warning method is not limited thereto and may include a method of visually or audibly notifying the user of information related to the battery 2.

The disclosed embodiment can determine the cause of discharge of the battery and provide an appropriate charging mode by including the above-described configuration.

In addition, the disclosed embodiment includes the above-described configuration, so that the battery discharge history is stored and the stored information is shared with the service center, so that the vehicle user can take appropriate measures.

In addition, the disclosed embodiment may charge the battery according to an appropriate charging mode and improve durability of the battery by including the above-described configuration.

Embodiments of the present disclosure have been described above. In the embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components, and task components, and may include processes, functions, attributes, procedures, subroutines, segments of program code, drivers, firmware, microcode, circuitry, data, databases, data structures, tables, arrays, and/or variables. The operations provided for in the components and modules may be combined into fewer components and modules or further separated into additional components and modules. In addition, the components and modules may be implemented such that they execute one or more central processing units (CPUs) in a device.

With that being said, and in addition to the above described embodiments, embodiments can thus be implemented through computer readable code/instructions in/on a medium, e.g., a computer readable medium, to control at least one processing element to implement any above described embodiment. The medium can correspond to any medium/media permitting the storing and/or transmission of the computer readable code.

The computer-readable code can be recorded on a medium or transmitted through the Internet. The medium may include ROM, RAM, Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While specific embodiments have been described with respect to a limited number of embodiments, those having ordinary skill in the art, having the benefit of this disclosure, should appreciate that other embodiments can be devised which do not depart from the scope as disclosed herein. Accordingly, the scope should be limited only by the attached claims.

What is claimed is:

1. A vehicle comprising:
   a battery;
   a sensor configured to detect at least one of a charging state, a discharging state, or a performance state of the battery;
   a display configured to display the state of the battery; and
   a controller configured
      to judge a cause of discharge of the battery based on the detection result of the sensor,
      to control the display to display the cause of discharge of the battery,
      to judge a discharge history of the battery,
      to judge a discharge time of the battery based on the discharge history, in response to the comparison result of the discharge time of the battery and a preset time,
      to determine a charging voltage, a charging current, and a charging time of the battery to charge the battery, and
      to control the display to display a charging mode of the battery based on the determined charging voltage, charging current and charging time.

2. The vehicle according to claim 1, wherein the controller is configured to calculate an internal resistance, a total amount of discharge, an order of discharge, a discharge time, or an average discharge current of the battery, and to control the display to display the charging mode of the battery based on the calculation result.

3. The vehicle according to claim 1, wherein the controller is configured to judge a discharge time based on the discharge history.

4. The vehicle according to claim 3, wherein the controller is configured to, when the discharge time of the battery is equal to or shorter than the preset time, to determine the charging mode by setting the charging voltage as a first charging voltage, the charging current as a first charging current, and the charging time as a first charging time.

5. The vehicle according to claim 4, wherein the controller is configured to, when the discharge time of the battery is longer than the preset time, to determine the charging mode by setting the charging voltage as a second charging voltage, the charging current as a second charging current, and the charging time as a second charging time.

6. The vehicle according to claim 4, further comprising:
   a power supply configured to supply power to the battery, and
   wherein the controller is configured to control the display to display a forced discharge warning signal of the power supply based on the determination result.

7. The vehicle according to claim 5, wherein the controller is configured to control the display so that the vehicle displays a discharge warning or a discharge warning signal for an external electronic device provided in the vehicle based on the determination result.

8. The vehicle according to claim 5, wherein the controller is configured to compare the performance state value of the battery with the performance state value in the full charge state of the battery, when it is judged that the performance state value of the battery has a value lower than a reference ratio of the full charge state value of the battery, to determine the charging mode by setting the charging voltage as a third charging voltage, the charging current as a third charging current, and the charging time as a third charging time.

9. The vehicle according to claim 8, wherein the controller is configured to compare the current value of the internal resistance and the initial value of the internal resistance, when it is judged that the current value of the internal resistance is greater than the initial value of the internal resistance, to determine the charging mode by setting the charging voltage as a fourth charging voltage, the charging current as a fourth charging current, and the charging time as a fourth charging time.

10. A control method of a vehicle, the control method comprises:
    detecting, by a sensor, at least one of a charging state, a discharging state, or a performance state of the battery;
    displaying, by a display, the state of the battery;
    judging, by a controller, a cause of discharge of the battery based on the detection result;
    displaying, by the display, the cause of discharge of the battery;
    judging, by the controller, a discharge history of the battery;
    judging, by the controller, a discharge time of the battery based on the discharge history;
    in response to the comparison result of the discharge time of the battery and a preset time, determining, by the controller, a charging voltage, a charging current, and a charging time of the battery to charge the battery; and
    displaying, by the display, a charging mode of the battery based on the determined charging voltage, charging current, or charging time.

11. The control method according to claim 10, wherein the controlling comprises:
    calculating an internal resistance, a total amount of discharge, an order of discharge, a discharge time, or an average discharge current of the battery; and
    controlling the display to display the charging mode of the battery based on the calculation result.

12. The control method according to claim 10, further comprising:
    judging a discharge time of the battery based on the discharge history.

13. The control method according to claim 12, wherein the controlling comprises:
    when the discharge time of the battery is equal to or shorter than the preset time, determining the charging mode by setting the charging voltage as a first charging voltage, the charging current as a first charging current, and the charging time as a first charging time.

14. The control method according to claim 13, wherein the controlling comprises:
    when the discharge time of the battery is longer than the preset time, determining the charging mode by setting the charging voltage as a second charging voltage, the charging current as a second charging current, and the charging time as a second charging time.

15. The control method according to claim 13, further comprising:
    supplying power to the battery, and
    wherein the controlling comprises controlling the display to display a forced discharge warning signal of the power supply based on the determination result.

16. The control method according to claim 14, wherein the controlling comprises:
    controlling the display so that the vehicle displays a discharge warning or a discharge warning signal for an external electronic device provided in the vehicle based on the determination result.

17. The control method according to claim 14, wherein the controlling comprises:
- comparing the performance state of the battery with the performance state in the full charge state of the battery; and
- when it is judged that the performance state of the battery is a reference ratio of the full charge state of the battery, determining a charging mode by setting the charging voltage as a third charging voltage, the charging current as a third charging current, and the charging time as a third charging time.

18. The control method according to claim 17, wherein the controlling comprises:
- comparing the current value of the internal resistance and the initial value of the internal resistance; and
- when it is judged that the current value of the internal resistance is greater than the initial value of the internal resistance, determining the charging mode by setting the charging voltage as a fourth charging voltage, the charging current as a fourth charging current, and the charging time as a fourth charging time.

* * * * *